No. 694,223.  
W. F. WILLIAMS.  
ELASTIC TIRE.  
(Application filed May 14, 1901.)
Patented Feb. 25, 1902.
(No Model.)
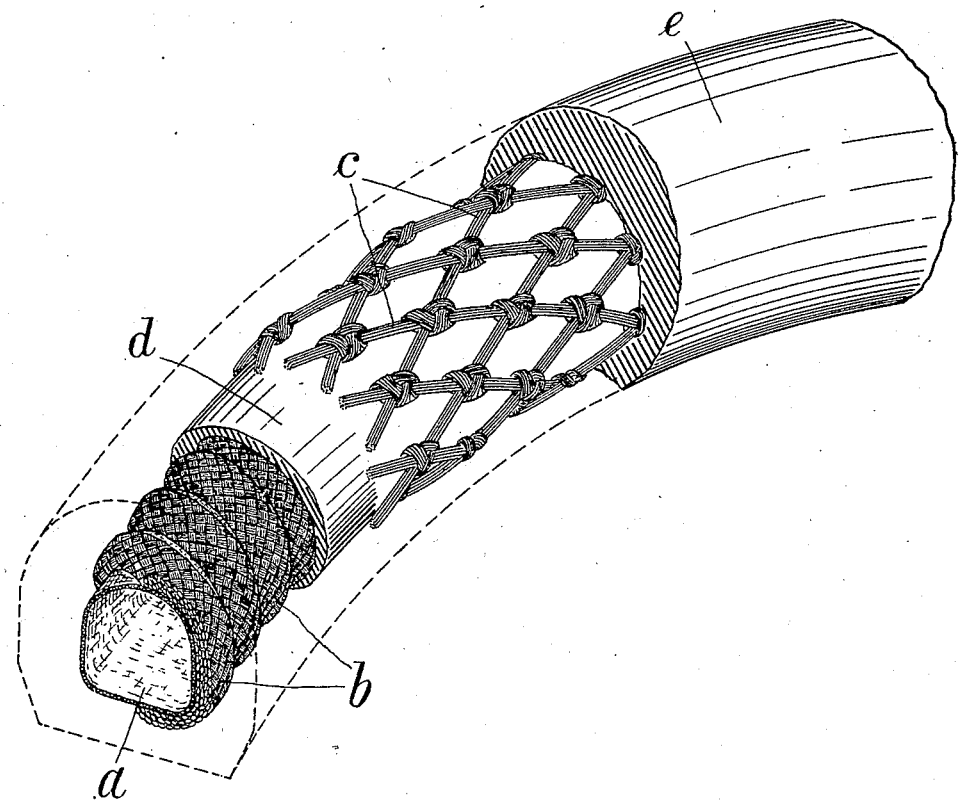
WITNESSES:  
C. E. Holske  
Wm M. Avery
INVENTOR  
William F. Williams  
BY  
ATTORNEYS

UNITED STATES PATENT OFFICE.

WILLIAM FREDERICK WILLIAMS, OF LONDON, ENGLAND.

ELASTIC TIRE.

SPECIFICATION forming part of Letters Patent No. 694,223, dated February 25, 1902.

Application filed May 14, 1901. Serial No. 60,164. (No model.)

*To all whom it may concern:*

Be it known that I, WILLIAM FREDERICK WILLIAMS, a subject of the King of Great Britain, residing at 17 and 18 Great Pulteney street, Golden Square, London, England, have invented new and useful Improvements in Elastic Tires, of which the following is a specification.

My invention relates to the manufacture of elastic tires of the solid or cushion type, and has for its object to so strengthen the tire and to so distribute the strains to which such tires are liable to be subjected as to enable the tire the better to resist the crushing effect of the load and likewise the strains, whether in the circumferential direction of the wheel or in the lateral direction, incidental to the propulsion, steering, or arresting of the vehicle, which strains tend to cause the tire to become lengthened or even to tear the rubber apart in the longitudinal or transverse direction of the tire.

The invention consists, essentially, in embedding at any point or points in the thickness of the rubber of which the tire is composed a reticulated or open-meshed fabric in the nature of a fishing-net formed of single or multiple cords or strands knotted together at the points of intersection or crossing, the cords or strands encircling the tire in oppositely-oblique directions, so that the meshes are of diamond form with their diagonals in the transverse and circumferential directions of the tire. The meshes of the fabric are large and open, so that the rubber will pass through them and fill them up and form a homogeneous mass in which the netting is completely enveloped, while the knots by which the cords or strands are connected together afford a multiplicity of points of abutment or resistance to prevent the cords or strands tearing out of the rubber, the knotting of the strands together at each point of intersection insuring that the cords or strands will mutually support each other in resisting all strains that may come upon them and so strengthen the rubber as to prevent tearing asunder.

In the accompanying drawing, which shows in perspective a portion of a hollow tire made according to my invention, the outer layer of rubber being partially removed to show the netting, the rubber tire may be of approximately D-section, or of circular or any other required form, and may be provided with the usual canvas lining $a$ for the bore of the tire, and may or may not have embedded in it a helically-wound fibrous cord $b$ immediately around the canvas lining $a$.

$c$ is the netted fabric of open mesh.

In the case of a hollow tire, such as shown, having a cord or cords $b$, the tire would be built up on a mandrel, whereon the lining $a$ is first lapped, and then the cord or cords $b$ are wound thereon, and an inner layer of rubber $d$ is then applied around said cord $b$. The netted fabric is applied upon the inner layer of rubber, and preferably while the latter is still plastic, so that the strands and knots of the netting become partially embedded therein, the netting being tightly stretched and so applied that the strands extend in opposite helical directions around the tire, as shown. The netting may be applied in the form of a strip whereof the edges are laced or tied or otherwise connected together toward the base of the tire after the strip has been lapped around the layer of rubber $d$.

$e$ is the outer coating of rubber, which when applied around the netting $c$ completely fills up the meshes thereof and incloses the strands and knots, the two layers $d$ and $e$ of rubber thus uniting through the meshes and forming a continuous or homogeneous mass in which the netting is completely embedded.

In the case of a tire made in the straight length the netting may be made in the form of a tubular fabric and be slipped onto the partially-made tire and be drawn tightly thereon in the manner of a stocking, and in any case the relative thicknesses of the layers of rubber $d$ $e$ may be varied; or, in other words, the netting may be applied at any desired intermediate point in the thickness of the rubber and either in conjunction or not with the circumferentially-wound cords $b$. Two or more concentric layers of netting may be similarly embedded at different points in the thickness of the rubber.

I claim—

1. A rubber tire of the solid or cushion type, comprising a helically-wound fibrous cord, a layer of rubber on the fibrous cord, and a netted fabric formed of cords or strands knotted together at their points of intersection and embedded in the rubber, the cords or strands encircling the tire in opposingly-oblique directions so that the meshes are of diamond shape with their diagonals in the transverse and circumferential directions of the tire, as set forth.

2. A rubber tire, comprising a canvas lining, a helically-wound fibrous cord around the lining, and a layer of rubber upon the fibrous cord, the layer of rubber having embedded therein a netted fabric formed of cords or strands knotted together at their points of intersection, the cords or strands encircling the tire in opposingly-oblique directions so that the meshes are of diamond shape with their diagonals in the transverse and circumferential directions of the tire, as set forth.

WILLIAM FREDERICK WILLIAMS.

Witnesses:
C. G. CLARK,
THOMAS W. KENNARD.